3,737,371
HIGH OPACITY PAPER
Seward M. Bazler, Cincinnati, and William C. Lane, Chillicothe, Ohio, assignors to The Mead Corporation, Dayton, Ohio
No Drawing. Continuation-in-part of application Ser. No. 738,133, June 19, 1968. This application July 29, 1970, Ser. No. 59,327
Int. Cl. D21h 3/66
U.S. Cl. 162—181 B                    9 Claims

ABSTRACT OF THE DISCLOSURE

A titanium dioxide filled paper with an added crystalline colloid for improved light scattering efficiency. The crystalline colloidal material is selected from the class consisting of hydrous aluminum oxide and hydrous magnesium silicate having an average volume equivalent to a sphere with a diameter ranging between about 10–30 millimicrons. The improved scattering efficiency increases the opacity of the sheet and makes it especially adapted for use as a print sheet in a decorative plastic laminate.

CROSS REFERENCE TO RELATED APPLICATION

This is a continuation-in-part of application Ser. No. 738,133, filed June 19, 1968, and now abandoned.

BACKGROUND OF THE INVENTION

This invention relates to paper of increased opacity and more particularly to titanium dioxide filled sheets having improved light scattering efficiency.

Opacity in paper, as in other materials, is produced by scattering and reflection of light in its passage through the sheet. In the usual case, the paper is characterized by abrupt changes in index of refraction at many air/fiber interfaces and a consequent opacity which generally increases with increasing basis weight. By adjusting basis weight and surface texture, it is ordinarily feasible to meet most printing paper opacity requirements. For special purpose papers, however, it is often necessary to augment opacity by addition of light scattering filler material such as titanium dioxide.

A major problem in making a titanium dioxide filled sheet is the tendency of the very small titanium dioxide particles to pass between the cellulosic fibers and down into the white water. The economics of this situation force the papermaker into adding any of numerous well known retention aids. With such retention aids it is feasible to retain in the sheet as much as 90 percent of the filler material. Unfortunately, this also causes flocculation or agglomeration of the titanium particles and a reduction in their scattering efficiency.

The above mentioned problem is especially acute in the case of print sheets for use in decorative laminates. For such paper it is usual to apply a fancy pattern to the sheet and then to saturate it prior to lamination with a resin such as melamine formaldehyde in the amount of about 40% based upon the weight of the finished sheet. During the saturation step the air in the sheet is replaced by resin having an index of refraction approximately the same as that of cellulose. As a result thereof, the sheet becomes transparentized; the only significant remaining opacity being that which is contributed by any added filler material.

SUMMARY OF THE INVENTION

Unexpectedly it has been found in accordance with the practice of this invention that paper comprising flocculated titanium dioxide exhibits significantly increased opacity if there is added to the furnish for said paper a small amount of a crystalline colloidal material. The colloidal material normally has a stable electrical charge impressed upon its particle surfaces and in the practice of this invention such charge may be either positive or negative. Crystalline colloids selected from the class consisting of hydrous aluminum oxide and hydrous magnesium silicate have been found to be effective when added in amounts as small as about .025 percent based upon total furnish weight. No upper limit has been observed except an economic limit imposed by the relatively high cost of these colloidal materials.

It is well known that the scattering efficiency of a particle is determined by the index of refraction and by the particle size. Generally speaking the scattering efficiency peaks for a particle size between about 200 and 300 millimicrons (about half the wavelength of light) and thereafter drops off sharply with decreasing particle size. Unexpectedly and contrary to theory it has been found that crystalline colloidal particles with a size (diameter of equivalent spherical volume) less than about 50 millimicrons somehow enhance the scattering power of much larger titanium dioxide particles when introduced together therewith in a papermaking furnish.

It is believed that the increased scattering power results from entry of the colloidal material into the structure of the titanium dioxide flocs. It appears that the colloidal particles associate with the titanium dioxide particles in a manner whereby the titanium dioxide particles become able to function as individual scatters of light while grouped together in large agglomerates. Thus it becomes possible to obtain improved titanium dioxide retention by common flocculation techniques but without concomitant loss of scattering efficiency. This is in sharp contrast to prior art opacity enhancing methods such as are shown in German Pat. 1,072,467 or U.S. Pat. 2,943,971 wherein large quantities of amorphous colloidal materials are employed to increase retention of or actually replace titanium dioxide particles.

DESCRIPTION OF THE PREFERRED EMBODIMENTS

The present invention contemplates increasing the opacity of flocculated titanium dioxide filled paper by adding to the furnish therefor a crystalline colloidal material in the amount of about 0.025 percent based upon total furnish weight to an economically imposed upper limit of about 0.75 percent, but preferably in a range of about 0.25 percent to about 0.5 percent. The furnish for such paper preferably comprises about 10 percent to about 60 percent by total weight of titanium dioxide which after flocculation produces a sheet having about 10 percent to about 50 percent by weight of flocced titanium dioxide particles.

Experiments have been performed using an opacifying material having a stable positive surface charge, a crystalline structure, and a spherical particle configuration with a diameter ranging from about 10 millimicrons to about 30 millimicrons. Other experiments have been performed using crystalline colloidal rod shaped particles of both positive and negative surface charge as the opacity enhancer. In these latter experiments the particles had a diameter of about 4 to 5 millimicrons and a length of about 100 millimicrons. In all these cases excellent results were obtained. Examples showing these experimental results follow.

For Examples I through IX the following procedure was employed.

Titanium dioxide was added to water in amount as stated and then dispersed by adding 0.3 percent (based upon weight of filler) of sodium hexametaphosphate and mixing in a Cowles mixer. The resulting slurry was added to a beater furnish of cellulosic fibers refined to a Canadian Standard Freeness of 450 ml.

To the combined furnish was added a dispersed aqueous slurry of colloidal opacifying material of type and amount as hereinafter stated. Thereafter the beater was emptied into a chest and adjusted with alum to a pH of about 6.0. For wet strength there was added 0.2 percent (based upon weight of total furnish) of a melamine formaldehyde resin. A high molecular weight polymer of acrylamide was employed as a flocculant and was added to the head box in amount of about 0.05 percent based upon the weight of total furnish. Following this the papers of the examples were made on a laboratory fourdrinier paper machine to a basis weight of about 100 lb. per 3,000 sq. ft. and with a titanium dioxide content of about 25 percent based upon total basis weight.

Finally the papers were rated for opacity. In all cases the opacity rating was made in an environment simulating that of a decorative plastic laminate. Specifically, the papers were saturated with a heavy mineral oil having an index of refraction approximating that of typical thermosetting plastic materials. The opacity parameter which is given for the examples is the scattering power SW as described in TAPPI Standard T425 M–60. In each case the stated scattering power has been corrected as necessary for reference to a basis weight of exactly 100 lb. per 3,000 sq. ft. An increase of 0.5 in the value of SW shows a significant opacity improvement in a plastic laminate.

EXAMPLE I

For reference purposes a sheet of paper was made to a basis weight of 100 lb. per 3,000 square ft. and tested as outlined above but without using any colloidal opacifying material. The titanium dioxide particles had a rutile crystalline structure and were added in amount to give a slurry of 28 percent titanium dioxide and 72 percent cellulosic fiber. The finished sheet had a content of about 25 percent by weight of titanium dioxide and a corrected scattering power of 10.7.

EXAMPLE II

A sheet was prepared as for Example I but there was added to the beater furnish 0.25 percent based upon furnish weight of a dispersed aqueous slurry of crystalline hydrous magnesium silicate particles having a rod shaped configuration. These particles had a diameter of about 4 millimicrons and an average length of about 100 millimicrons (volume equivalent to a sphere of about 13.5 millimicrons dia). The particles carried a negative surface charge and were made by an acidic treatment of chrysolite followed by mechanical attrition all in accordance with the teachings of U.S. Pat. 3,458,393. A suitable material of this type is available commercially under the trademark AVIBEST. The scattering power of this sheet was 12.0.

EXAMPLE III

A sheet was prepared as for Example I but with the addition to the beater furnish of a dispersed aqueous slurry of a hydrous aluminum oxide sold commercially by Cabot Corp. under the trademark ALON C. This material is a mixture of different crystalline forms of alumina consisting predominantly of the gamma modification. It has an average particle diameter of 30 millimicrons and is made by hydrolysis of aluminum chloride in a flame. The material has a surface charge which remains positive to a pH level as high as 9.1 (isoelectric point). It was added in amount about 0.25 percent based upon furnished weight. The scattering power of the sheet was 11.5.

EXAMPLE IV

A sheet was prepared as for Example I but with addition to the beater furnish of a dispersed aqueous slurry of a fibrous alumina monohydrate characterized by having the boehmite crystal lattice. The material has been prepared by heating an aqeous dispersion of alumina in the presence of a strong acid radical as described in U.S. Pat. 2,915,475. The fibrils had an average length of about 100 millimicrons, a diameter of about 4 to 5 millimicrons (volume equivalent to a sphere of about 15.5 millimicrons dia.), and were surface-modified by absorbed acetate ions to produce a resultant positive surface with an isoelectric point at pH=10.0. This opacifying material was added in amount about 0.25 percent based upon furnish weight. The corrected scattering power of the sheet was 12.0.

EXAMPLE V

A sheet was prepared as for Example I but with addition to the beater furnish of a dispersed aqueous slurry of hydrous aluminum oxide comprising spherical colloidal particles characterized by a diameter ranging between 10 and 15 millimicrons, a high positive surface charge and a crystalline structure. The colloidal material was added in amount of 0.25 percent based upon furnish weight. The corrected scattering power of the sheet was 12.1.

EXAMPLE VI

A sheet was prepared as in Example II with hydrous magnesium silicate for an opacifying material but in amount about 0.03 percent based upon furnish weight. The corrected scattering power of the sheet was 11.6.

EXAMPLE VII

For further reference purposes a sheet was made and tested as in Example I but using titanium dioxide having an anatase crystalline structure. No colloidal opacifying material was added. The corrected scattering power of the sheet was 9.4.

EXAMPLE VIII

A sheet was prepared as for Example VII but with addition to the beater furnish of hydrous magnesium silicate of the type described in Example II. The colloidal material was added in the amount 0.25 percent based upon furnish weight. The corrected scattering power of the sheet was 10.2.

EXAMPLE IX

In order to determine the opacifying effectiveness change with increasing amounts of a crystalline colloidal additive there were prepared three flocculated papermaking furnishes in which titanium dioxide was added in the amount of about 28 percent by weight of titanium dioxide plus fiber. To the first furnish was added about 0.25 percent by furnish weight of the hydrous magnesium silicate of Example II. In the second furnish was added about 0.50 percent of the same colloidal additive and in the third furnish was added about 0.75 percent. All three furnishes were then made into paper having a basis weight of about 100 lbs. per 3,000 sq. ft., saturated and tested for scattering power. The corrected scattering powers of the three sheets respectively were 11.0, 11.4, and 11.4.

For Examples X through XI the following procedure was employed.

Titanium dioxide having a rutile crystalline structure was directly added in amounts as stated to a beater furnish of cellulosic fibers refined to a Canadian Standard Freeness of 425 ml. Also added to the beater was 1.5 percent by weight of starch and an amount as stated of crystalline colloidal opacifying material.

Thereafter the beater was emptied into a chest, adjusted with alum to a pH of about 4.5, and then with ammonia to a pH of about 6.2. For wet strength there was added 0.75 percent by weight of total furnish of a melamine formaldehyde resin. Then a light flocculation was performed by adding about 0.1 percent by total furnish weight of a water soluble organic polymer containing both positive and negative charged sites in the same polymer chain. This flocculant is sold commercially by Calgon Corportaion under the trademark HYDRAID 773.

Following this the papers of the examples were made on a laboratory fourdrinier paper machine to a basis weight of about 65 lb. per 1,000 sq. ft. Lastly the papers were saturated with mineral oil and rated for opacity in a like manner as for the previous examples, but with the scattering power corrected for reference to a basis weight of exactly 65 lb. per 3,000 sq. ft.

EXAMPLE X

Three sheets were made as above stated to a basis weight of 65 lb. per 3,000 sq. ft. and with titanium dioxide added to the beater furnish in the amount of 52 percent by furnish weight. A crystalline colloidal hydrous magnesium silicate of the type described in Example II was added to the sheets in the amounts of 0, 0.026, and 0.52 percent by weight of total furnish. The corrected scattering powers of the three sheets respectively were 8.67, 8.72, and 9.10.

EXAMPLE XI

Two sheets having a titanium dioxide content of about 50 perecnt by weight were made as above stated with titanium dioxide added to the beater furnish in the amount of 58 percent by total furnish weight. The first sheet was made without any crystalline colloidal opacifying material while the second sheet had added to the beater furnish 0.26 percent by furnish weight of the crystalline colloidal material of Example II. The corrected scattering powers of these two sheets respectively were 9.45 and 9.60.

What is claimed is:

1. The process of making a high opacity paper comprising the steps of
    (1) preparing an aqueous slurry of cellulosic fibers,
    (2) adding titanium dioxide filler to said slurry in amount from about 10 percent to about 60 percent based upon the weight of fiber plus titanium dioxide,
    (3) adding a crystalline colloidal material to said slurry in amount from about 0.025 percent to about 0.75 percent based on total furnish weight, said crystalline colloid material being selected from (a) hydrous crystalline aluminum oxide having a stable positive surface charge and a spherical particle configuration with a diameter ranging from about 10 millimicrons to about 30 millimicrons and (b) hydrous crystalline magnesium silicate having a negative surface charge and rod shaped particles with a diameter of about 4 to 5 millimicrons and a length of about 100 millimicrons which is a volume equivalent to a sphere with a diameter of about 13.5 millimicrons,
    (4) flocculating the combined slurry for retention of the titanium dioxide, and
    (5) forming said paper from the flocculated slurry.

2. The process of claim 1 said crystalline colloidal material being hydrous crystalline magnesium silicate.

3. The process of claim 1 said crystalline colloidal material being hydrous crystalline aluminum oxide.

4. A high opacity paper comprising flocced titanium dioxide particles in amount from about 10 percent to about 50 percent based on total weight and a crystalline colloidal opacifying material in amount from about 0.025 percent to about 0.75 percent based on total weight, said crystalline colloid material being selected from (a) hydrous crystalline aluminum oxide having a stable positive surface charge and a spherical particle configuration with a diameter ranging from about 10 millimicrons to about 30 millimicrons and (b) hydrous crystalline magnesium silicate having a negative surface charge and rod shaped particles with a diameter of about 4 to 5 millimicrons and a length of about 100 millimicrons which is a volume equivalent to a sphere with a diameter of about 13.5 millimicrons.

5. The paper of claim 4, said colloidal material being hydrous crystalline magnesium silicate.

6. The paper of claim 4, said crystalline colloidal material being hydrous crystalline aluminum oxide.

7. A print sheet for a plastic laminate comprising flocced titanium dioxide particles in amount from about 25 percent to about 50 percent based upon total weight and a crystalline colloidal opacifying material in amount from about 0.25 percent to about 0.5 percent based upon total weight, said opacifying material being selected from the class consisting of hydrous aluminum oxide and hydrous magnesium silicate and the particles comprising said opacifying material having an average volume equivalent to a sphere with a diameter ranging between about 10 millimicrons and about 30 millimicrons.

8. A print sheet according to claim 7 and having a basis weight ranging from about 65 pounds per 3,000 square feet to about 100 pounds per 3,000 square feet.

9. A print sheet according to claim 8 said opacifying material being hydrous magnesium silicate and the particles comprising said opacifying material being of rod shaped configuration with a diameter of about 4 millimicrons and a length of about 100 millimicrons.

References Cited

UNITED STATES PATENTS

| | | | |
|---|---|---|---|
| 3,234,075 | 2/1966 | Braitberg | 162—181 R X |
| 2,917,426 | 12/1959 | Bugosh | 162—181 R |
| 3,117,944 | 1/1964 | Harrell | 162—181 A X |
| 2,943,013 | 6/1960 | Arledter | 162—181 A |
| 3,203,818 | 8/1965 | Rechmann et al. | 106—300 |
| 3,409,454 | 11/1968 | Andrew et al. | 106—300 |
| 3,459,575 | 8/1969 | Andrew et al. | 106—300 |
| 3,523,810 | 8/1970 | Swank | 106—300 |
| 3,545,994 | 12/1970 | Lott et al. | 106—300 X |
| 2,113,380 | 4/1938 | Nichols | 106—300 |
| 2,943,971 | 7/1960 | Taylor | 162—181 B |

OTHER REFERENCES

Casey, "Pulp & Paper," vol. 3, pp. 1729–30; Interscience, New York, 1961.

S. LEON BASHORE, Primary Examiner

F. F. FREI, Assistant Examiner

U.S. Cl. X.R.

162—181 C